UNITED STATES PATENT OFFICE.

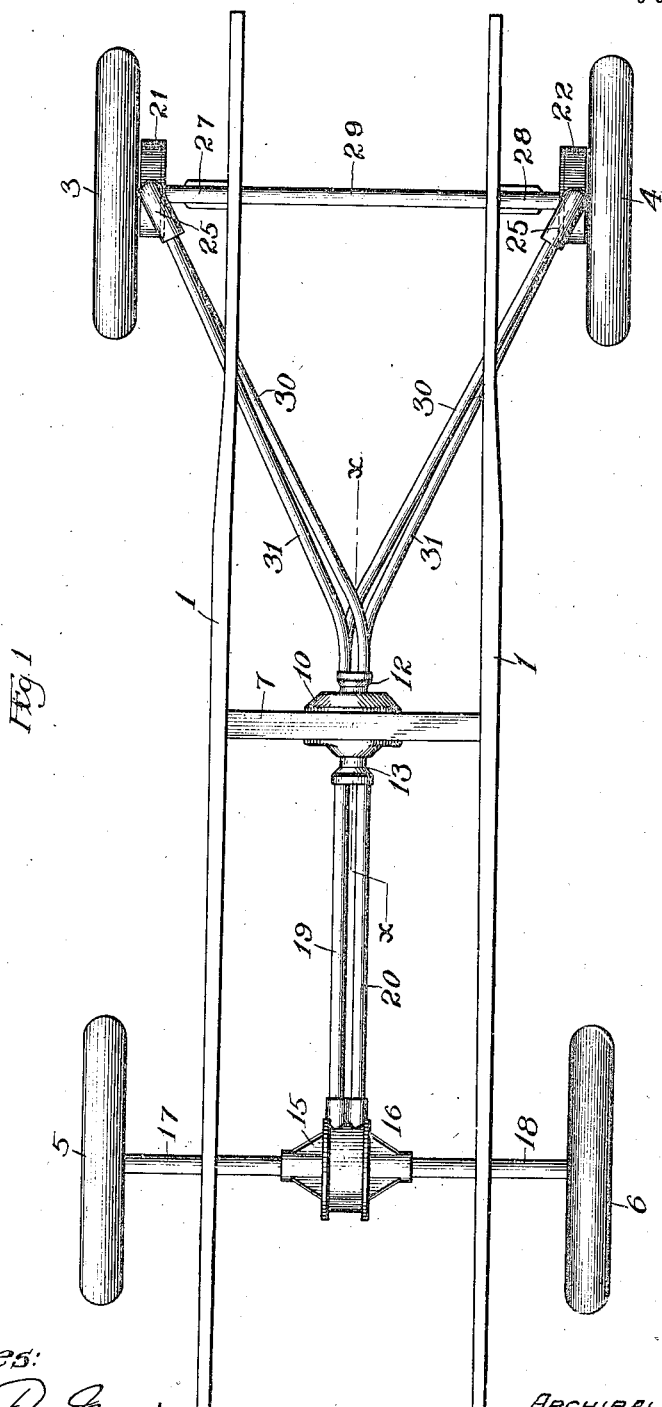

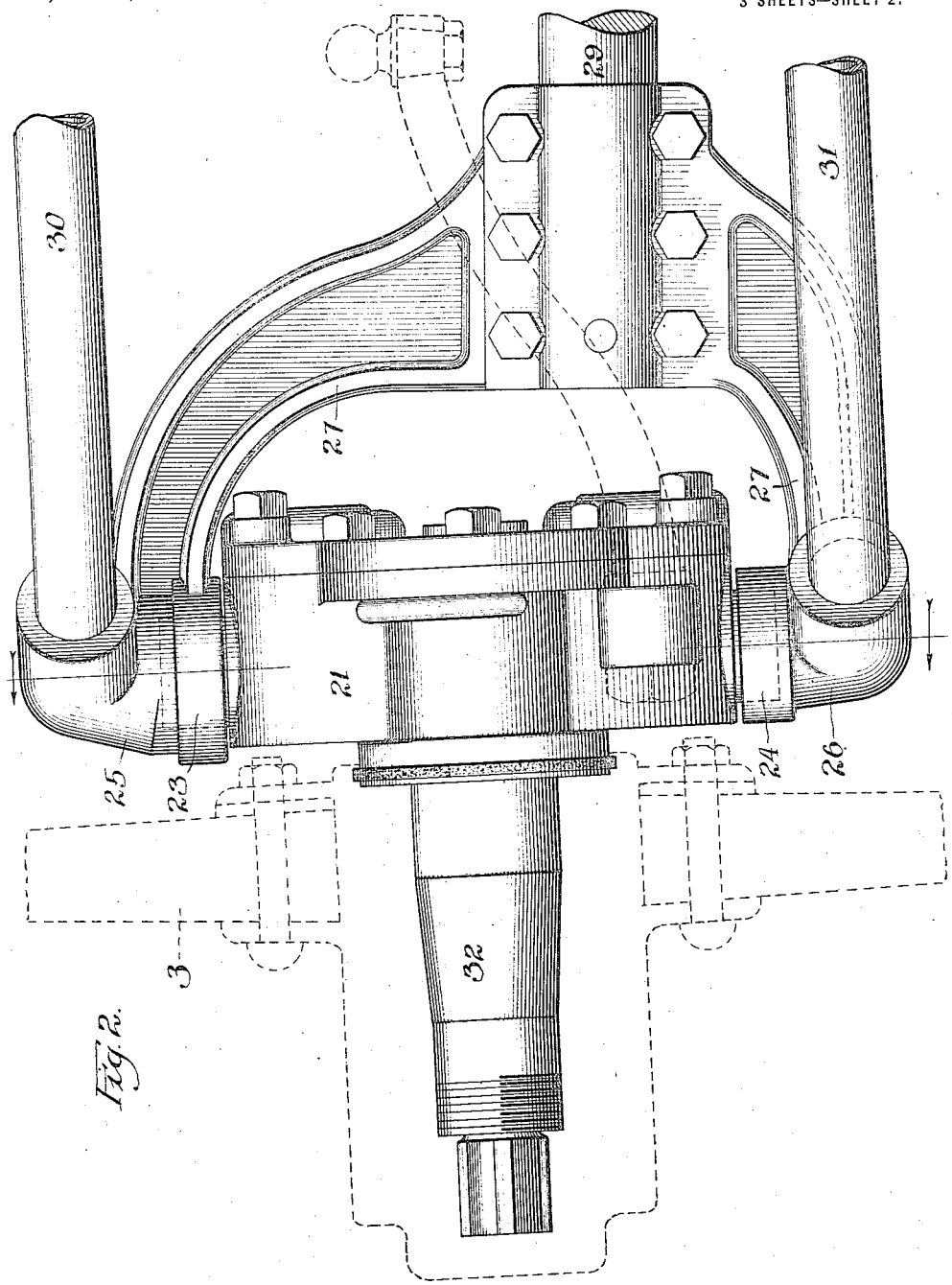

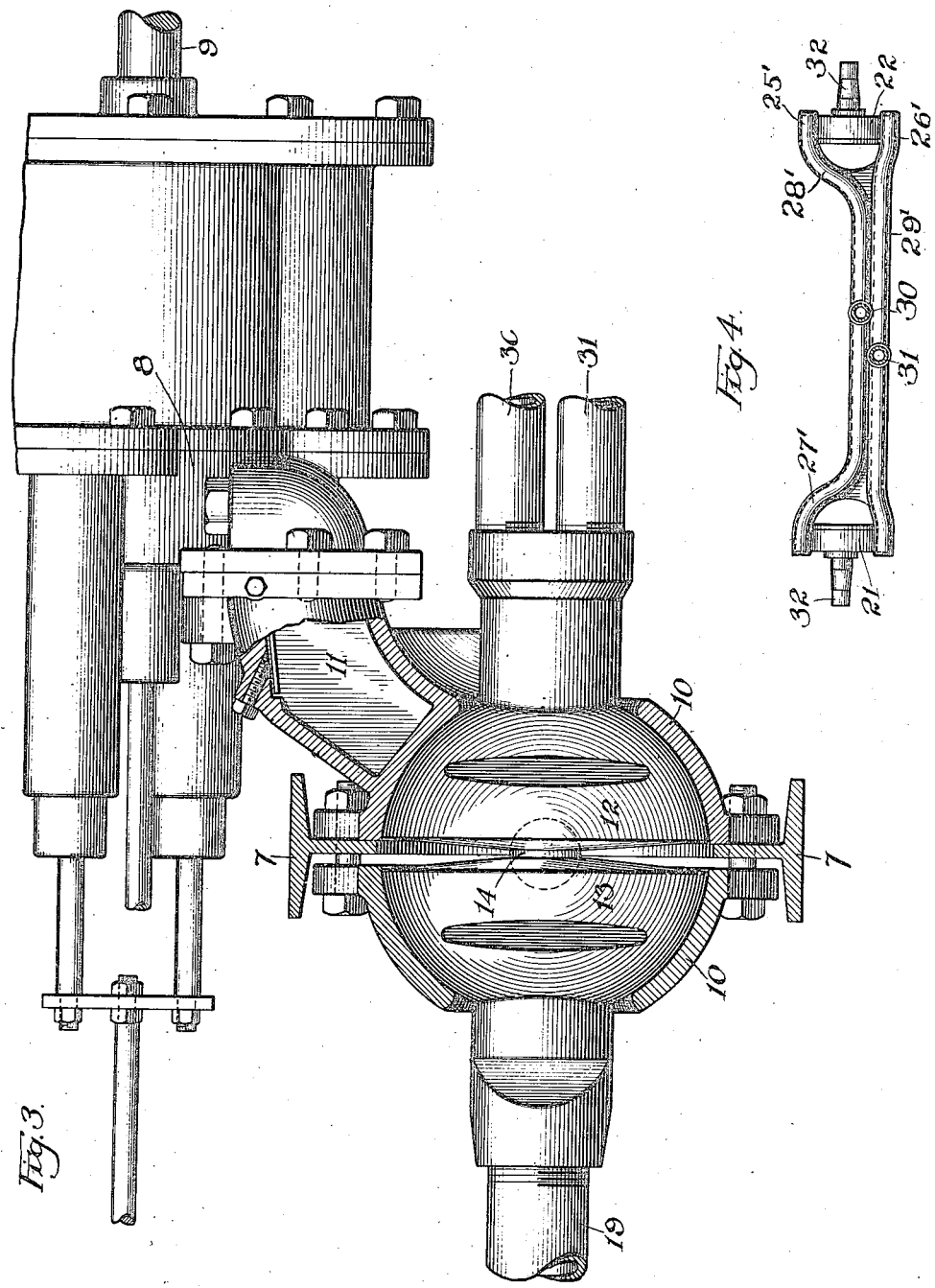

ARCHIBALD T. KEENE, OF CHICAGO, ILLINOIS, ASSIGNOR, BY DIRECT AND MESNE ASSIGNMENTS, TO KEENE HYDRAULIC TRANSMISSION COMPANY, A CORPORATION OF ARIZONA.

FLUID-POWER TRANSMISSION.

1,153,930. Specification of Letters Patent. Patented Sept. 21, 1915.

Application filed March 30, 1914. Serial No. 828,331.

*To all whom it may concern:*

Be it known that I, ARCHIBALD T. KEENE, a citizen of the United States of America, and a resident of Chicago, in the county of Cook, State of Illinois, have invented certain new and useful Improvements in Fluid-Power Transmissions, of which the following is a specification.

This invention relates to power transmission systems of the fluid type, used in the propulsion of power driven vehicles, and has for its object to provide a simple and efficient structural arrangement and combination of parts, whereby the series of supply and return pipes between the circulating pump and the series of motors of the system, are utilized as equalizing radius members to hold said motors and their immediate accessories, to predetermined paths in their various movements in horizontal, vertical and intermediate planes, in the normal travel of the motor vehicle along the road.

A further object is to provide an efficient and substantial structural formation and arrangement of an individual driving motor and its supply and return pipe connections, whereby said pipe connections are adapted to constitute efficient equalizing or radius members for a fore or pivotally mounted wheel of a motor vehicle, all as will hereinafter more fully appear.

In the accompanying drawings:—Figure 1, is a plan view illustrating the general arrangement of parts in the present invention, as applied to a fore and rear wheel driven motor vehicle. Fig. 2, is an enlarged detail front elevation, illustrating the arrangement of the motor and accessories for propelling a fore or pivotally mounted wheel of a motor vehicle. Fig. 3, is a detail longitudinal sectional elevation on line $x-x$, Fig. 1. Fig. 4, is a front elevation of a modified arrangement of the motors and accessories for propelling the fore or pivotally mounted wheels of the motor vehicle.

Similar reference numerals indicate like parts in the several views.

Referring to the drawings, 1 represents the main frame of a motor driven vehicle, mounted in any usual manner on the fore and rear wheels 3, 4 and 5, 6, to constitute the running gear of a motor vehicle.

7 is a rigid transverse beam attached to the main frame 1, intermediate its length, and constituting a means for receiving the pull and thrust of the radius members by means of which the wheels of the motor vehicle, and the accessories of said wheels, are confined to predetermined paths in vertical, horizontal and intermediate paths, as hereinafter more fully set forth.

8 is the circulating pump of the fluid transmission system, and preferably of the rotary type described in my application for patent, Serial No. 830,392, filed April 8, 1914. Said pump is mounted in any usual manner on the main frame 1, and preferably in adjacent relation to the transverse beam 7, aforesaid, as shown in Fig. 3.

9 is the driving shaft of the circulating pump 8, and is preferably coupled in a direct manner to the main shaft of a gas engine or like power supply, carried on the main frame 1.

10 is the stationary hollow outer shell or casing of a universal joint, preferably of the type described in my application for patent, Serial No. 828,332, filed March 30, 1914. Said shell or casing is bolted or otherwise secured to the transverse beam 7, aforesaid, and is preferably provided with a hollow extension 11, by which connection is made with the induction-eduction end of the circulating pump 8, aforesaid, and as shown more particularly in Fig. 3.

12 and 13 are the pair of hollow oscillatory heads of the aforesaid universal joint. Said heads are formed with spherically convex peripheries adapted to have close bearing in correspondingly formed spherically concave recesses formed in opposed relation in the interior of the stationary outer shell or casing 10, of the joint. And both the shell 10 and heads 12, 13, will be provided with passages and registering ports, as set forth in my aforesaid application Serial No. 828332, so as to provide an uninterrupted flow of the motive fluid from the circulating pump to the series of motors, and from said motors back to the pump. The heads 12, 13, are held to their bearings or seats in the outer shell or casing 10, by an abutment sphere 14, disposed centrally between the adjacent faces of said heads, as described in detail in my aforesaid application, Serial No. 828,332.

15 and 16 are the motors of the rear wheels 5 and 6 of the motor vehicle, and preferably of the rotary type described in my application for patent, Serial No. 776,689 filed June 30, 1913. And said motors are preferably mounted side by side and operatively connected in a direct manner to the individual driving shafts contained in the tubular carrying axles 17 and 18 of the rear driving wheels 5 and 6, of the motor vehicle.

19 and 20 are fluid conducting pipes extending from the motors 15, 16, aforesaid, to the oscillatory rear head 13 of the universal joint above described, and said pipes are rigidly attached at their respective ends to the motors 15, 16, and to the oscillatory head 13 aforesaid. And as so arranged said pipes are adapted to perform the additional function of equalizing or radius members between the parts, and impose on the rear wheels and their accessories a predetermined movement in vertical, horizontal and intermediate planes in the actual use of the motor vehicle.

21 and 22 are the respective individual motors of the fore or pivotally mounted wheels 3 and 4, of the motor vehicle, and preferably of the rotary type described in my application for patent, Serial No. 828,330 filed March 30, 1914. Each of said motors 21, 22, is provided with diametrically opposed hollow trunnions 23, 24, by which the motor casing is journaled vertically in the upper and lower tubular bearing heads 25, 26, of the yoke or knuckle 27 or 28 formed on the end of the fore axles 29 of a motor on the end of the fore axle 29 of a motor vehicle.

In the construction shown in Figs. 1 and 2, the tubular bearing heads 25, 26, are of an angular form, as shown, with their vertical portions forming the pivot sockets for the trunnions 23, 24, aforesaid, and with their horizontal portions adapted for the attachment of the supply and return fluid conducting pipes now to be described:—

30 and 31, are counterpart pairs of fluid conducting pipes, each pair being individual to a motor 21 or 22, aforesaid, and extend from the horizontal portions of the tubular bearing heads 25 and 26, to the oscillatory forward head of the universal joint before described, and rigidly secured at their respective ends to said bearing heads 25, 26, and to the oscillatory head 12, aforesaid. The described connection of parts is adapted to perform the additional function of equalizing or radius members between the parts, and impose upon the fore or steering wheels and their accessories, a predetermined movement in vertical, horizontal and intermediate planes, in the actual use of the motor vehicle.

32 are the stub axles which carry the fore or pivotally mounted wheels 3 and 4, of the motor vehicles, and said axles are preferably integrally formed on the shells or casings of the motors 21, 22 aforesaid.

In the modification illustrated in Fig. 4, the front axle 29' of the motor vehicle, is made tubular, to provide a pair of passages extending through the respective forks or yokes 27' and 28' at the respective ends of said axle 29', and individually connected with the tubular bearing heads 25' and 26', for the trunnions of the motor, in manner similar to that above described in connection with the main form of the invention. With the above described construction, a single pair of conducting pipes 30', 31'' will supply the supply and return means for the motive fluid to the aforesaid pair of motors, in that the tubular formation of the axle 29' is adapted to conduct the fluid to the inlets of said motors from a single supply pipe, and in like manner conduct the fluid from the outlets of said motors to a single return pipe, and thus arranged provides a simplified construction and arrangement of parts.

Having thus fully described my said invention what I claim as new and desire to secure by Letters Patent, is:—

1. In a system of fluid power transmission for motor vehicles, the combination of a main frame, a wheel and axle associated with said frame, a fluid motor associated with said wheel and axle, a tubular flexible joint having fixed and oscillatory members, the fixed member being attached to the aforesaid main frame, a plurality of hollow connecting members associated with the motor and an oscillatory member of the joint, and means for effecting a circulation of motive fluid through said joint, hollow connecting members and motor, substantially as set forth.

2. In a system of fluid power transmission for motor vehicles, the combination of a main frame, a front axle associated with said frame and having an end pivot yoke, a fluid motor pivotally mounted in said yoke, a tubular flexible joint having fixed and oscillatory members, the fixed member being attached to the aforesaid main frame a plurality of hollow connecting members associated with the motor and an oscillatory member of the joint, and means for effecting a circulation of motive fluid through said joint, hollow connecting members and motor, substantially as set forth.

3. In a system of fluid power transmission for motor vehicles, the combination of a main frame, front and rear wheels associated with said frame, a series of fluid motors associated with said wheels, a tubular flexible joint disposed intermediate of the front and rear motors, and having fixed and oscillatory members, the fixed member being attached to the main frame, a plurality of hollow connecting members associated with the motors and the oscillatory members of the joint, and means for effecting a circulation of motive fluid through said joint, hollow connecting members and motors, substantially as set forth.

4. In a system of fluid power transmission for motor vehicles, the combination of a main frame, front and rear axles and wheels associated with said frame a pair of fluid motors pivoted in the ends of the front axle, a second pair of fluid motors operatively connected in an individual manner to the rear pair of vehicle wheels, a tubular flexible joint disposed intermediate of the front and rear motors and having fixed and oscillatory members, the fixed member being attached to the main frame, a plurality of hollow connecting members associated with the motors and the oscillatory members of the joint, and means for effecting a circulation of motive fluid through said joint, hollow connecting members and motors, substantially as set forth.

Signed at Chicago, Illinois, this 27th day of March, 1914.

ARCHIBALD T. KEENE.

Witnesses:
  THOMAS RHODUS,
  ROBERT BURNS.